(12) United States Patent
Choi et al.

(10) Patent No.: US 11,747,914 B2
(45) Date of Patent: Sep. 5, 2023

(54) SYSTEM AND METHOD FOR PROVIDING ELECTRIC BOOK BASED ON READING TYPE

(71) Applicant: WOONGJIN THINKBIG CO., LTD., Paju-si (KR)

(72) Inventors: Samrak Choi, Paju-si (KR); Uiyoung Kim, Paju-si (KR); Sangboon Kim, Paju-si (KR)

(73) Assignee: WOONGJIN THINKBIG CO., LTD., Paju-si (KR)

(*) Notice: Subject to any disclaimer, the term of this patent is extended or adjusted under 35 U.S.C. 154(b) by 129 days.

(21) Appl. No.: 17/468,408

(22) Filed: Sep. 7, 2021

(65) Prior Publication Data
US 2022/0075456 A1 Mar. 10, 2022

(30) Foreign Application Priority Data

Sep. 8, 2020 (KR) .................. 10-2020-0114696

(51) Int. Cl.
*G06F 3/03* (2006.01)
*G06F 3/01* (2006.01)
*G09G 3/20* (2006.01)

(52) U.S. Cl.
CPC ............ *G06F 3/0304* (2013.01); *G06F 3/013* (2013.01); *G09G 3/20* (2013.01); *G09G 2320/0613* (2013.01); *G09G 2340/12* (2013.01); *G09G 2354/00* (2013.01)

(58) Field of Classification Search
None
See application file for complete search history.

(56) References Cited

U.S. PATENT DOCUMENTS 9,336,204 B1 * 5/2016 Amundsen .............. G06F 40/40

FOREIGN PATENT DOCUMENTS

KR 10-1204348 A 11/2012
KR 10-2016-0137497 A 11/2016

OTHER PUBLICATIONS

Korean Office Action dated Oct. 29, 2020 as received in application No. 10-2020-0114696.

* cited by examiner

*Primary Examiner* — Christopher J Kohlman
(74) *Attorney, Agent, or Firm* — Maschoff Brennan

(57) ABSTRACT

Disclosed are a system and method for providing an electronic book based on a reading type, which can provide one electronic book in various forms depending on the reading types of users. A reader terminal of the system outputs an electronic book, which has different texts and image ratios depending on the reading type of a user, on a screen, detects a sight area at which the user stares, by capturing an image of eye movement of the user who reads the electronic book, and sets and updates the reading type of the user based on the sight area.

19 Claims, 15 Drawing Sheets

[FIG. 1]
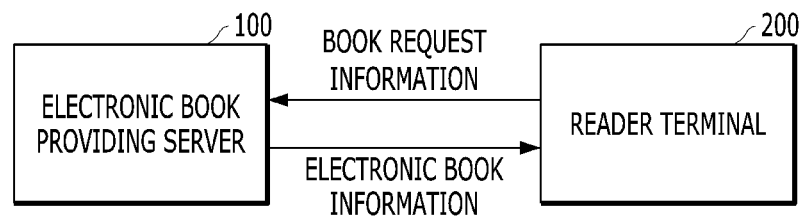

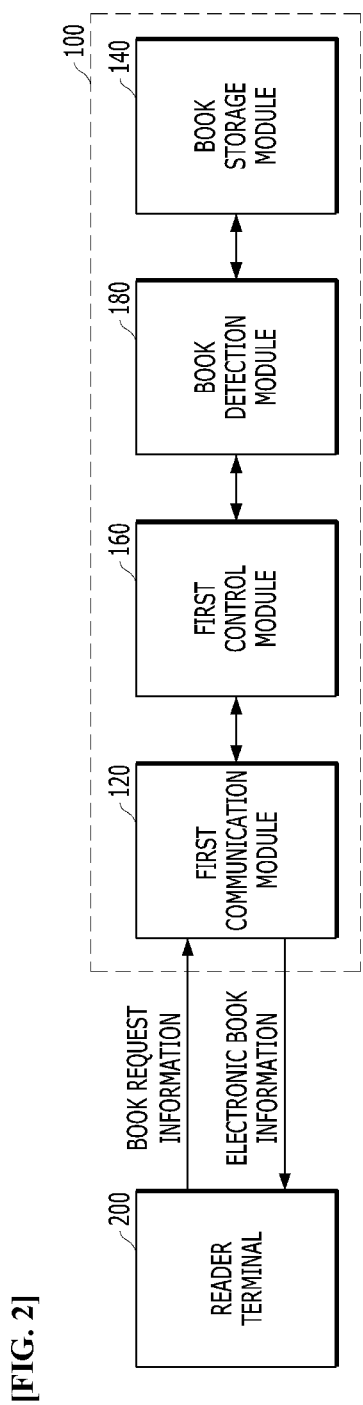
[FIG. 2]

[FIG. 3]

|  | BOOK IDENTIFIER | PAGE NUMBER | BASIC PAGE IMAGE | TEXT-BASED PAGE IMAGE | IMAGE-BASED PAGE IMAGE |
|---|---|---|---|---|---|
| PAGE IMAGE INFORMATION 1 | B01 | 1 | BASIC PAGE IMAGE 1 | TEXT-BASED PAGE IMAGE 1 | IMAGE-BASED PAGE IMAGE 1 |
| PAGE IMAGE INFORMATION 2 | B01 | 2 | BASIC PAGE IMAGE 2 | TEXT-BASED PAGE IMAGE 2 | IMAGE-BASED PAGE IMAGE 2 |
|  |  | . . . |  |  |  |
| PAGE IMAGE INFORMATION n | B01 | n | BASIC PAGE IMAGE n | TEXT-BASED PAGE IMAGE n | IMAGE-BASED PAGE IMAGE n |

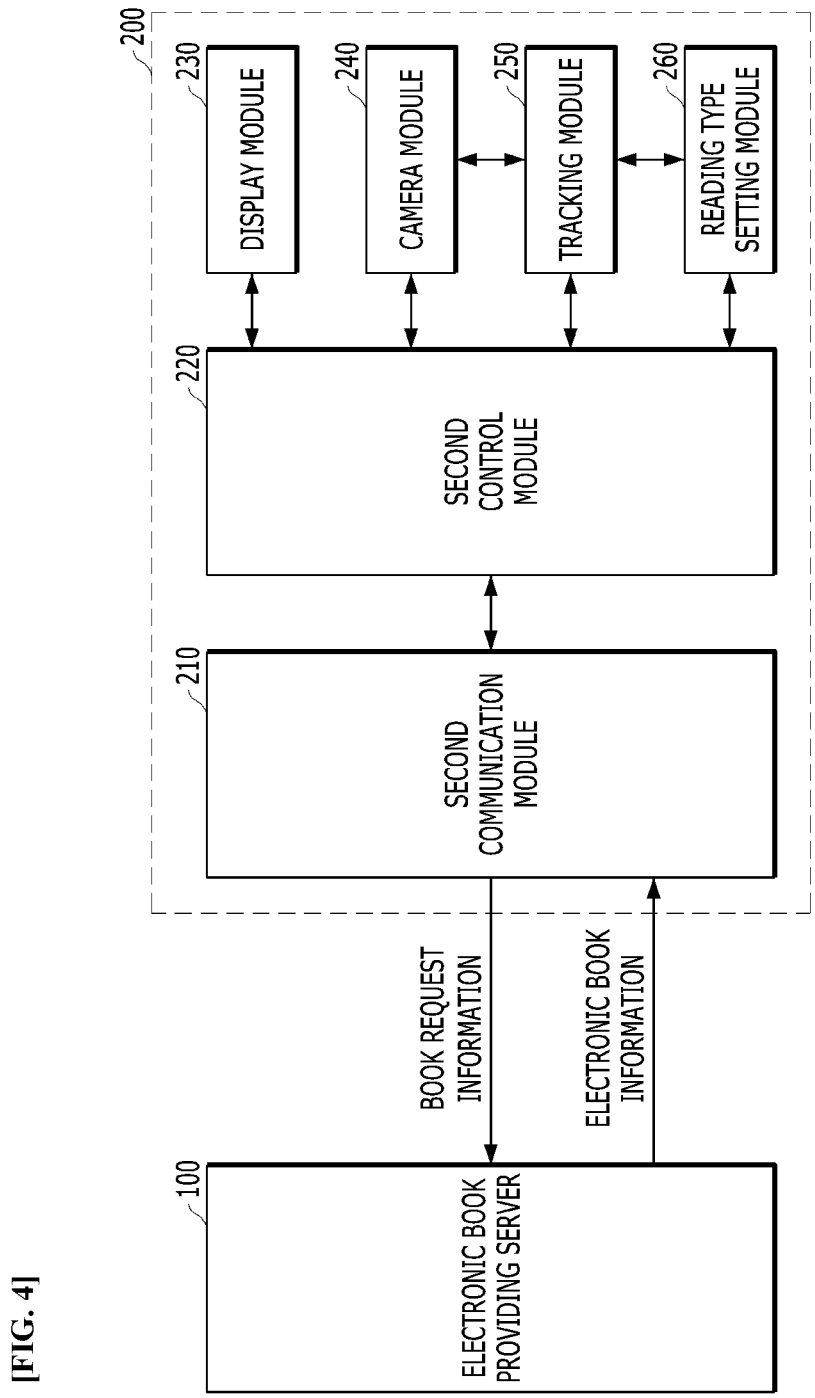

[FIG. 5]
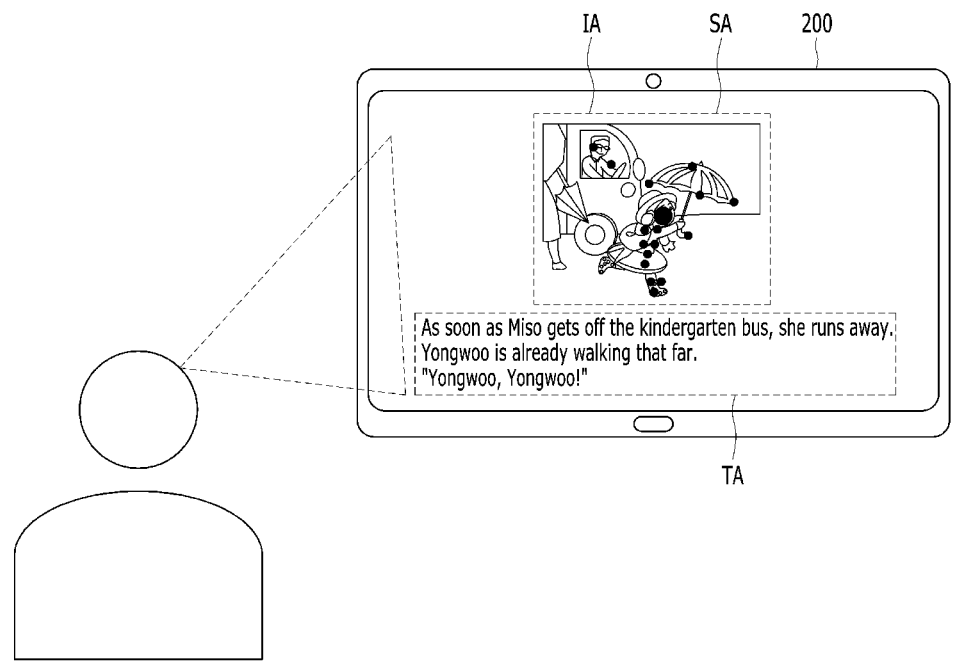

[FIG. 6]
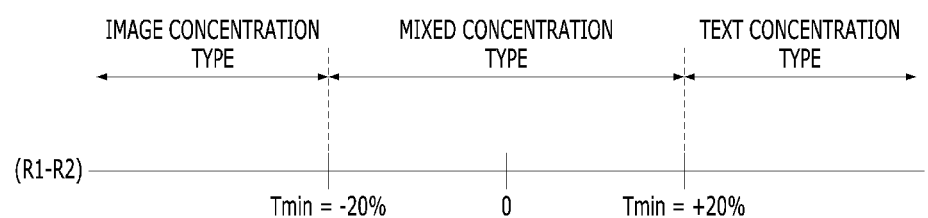

[FIG. 7]

| | BOOK IDENTIFIER | PAGE NUMBER | READING TYPE | DISPLAY LOCATION INFORMATION |
|---|---|---|---|---|
| TEXT INFORMATION 1-1 | B01 | 1 | MIXED CONCENTRATION TYPE | (x11, y11) |
| TEXT INFORMATION 1-2 | B01 | 1 | TEXT CONCENTRATION TYPE | (x12, y12) |
| TEXT INFORMATION 1-3 | B01 | 1 | IMAGE CONCENTRATION TYPE | (x13, y13) |
| IMAGE INFORMATION 1-1 | B01 | 1 | MIXED CONCENTRATION TYPE | (x11', y11') |
| IMAGE INFORMATION 1-2 | B01 | 1 | TEXT CONCENTRATION TYPE | (x12', y12') |
| IMAGE INFORMATION 1-3 | B01 | 1 | IMAGE CONCENTRATION TYPE | (x13', y13') |
| TEXT INFORMATION 2-1 | B01 | 2 | MIXED CONCENTRATION TYPE | (x21, y21) |
| TEXT INFORMATION 2-2 | B01 | 2 | TEXT CONCENTRATION TYPE | (x22, y22) |
| IMAGE INFORMATION 2-1 | B01 | 2 | MIXED CONCENTRATION TYPE | (x21', y21') |
| IMAGE INFORMATION 2-2 | B01 | 2 | TEXT CONCENTRATION TYPE | (x22', y22') |
| TEXT INFORMATION 3-1 | B01 | 3 | MIXED CONCENTRATION TYPE | (x31, y31) |
| TEXT INFORMATION 3-2 | B01 | 3 | IMAGE CONCENTRATION TYPE | (x32, y32) |
| IMAGE INFORMATION 3-1 | B01 | 3 | MIXED CONCENTRATION TYPE | (x31', y31') |
| IMAGE INFORMATION 3-2 | B01 | 3 | IMAGE CONCENTRATION TYPE | (x32', y32') |
| ⋮ | ⋮ | ⋮ | ⋮ | ⋮ |
| TEXT INFORMATION n-1 | Bxx | k | MIXED CONCENTRATION TYPE | (x31', y31') |
| IMAGE INFORMATION n-1 | Bxx | k | IMAGE CONCENTRATION TYPE | (x32', y32') |

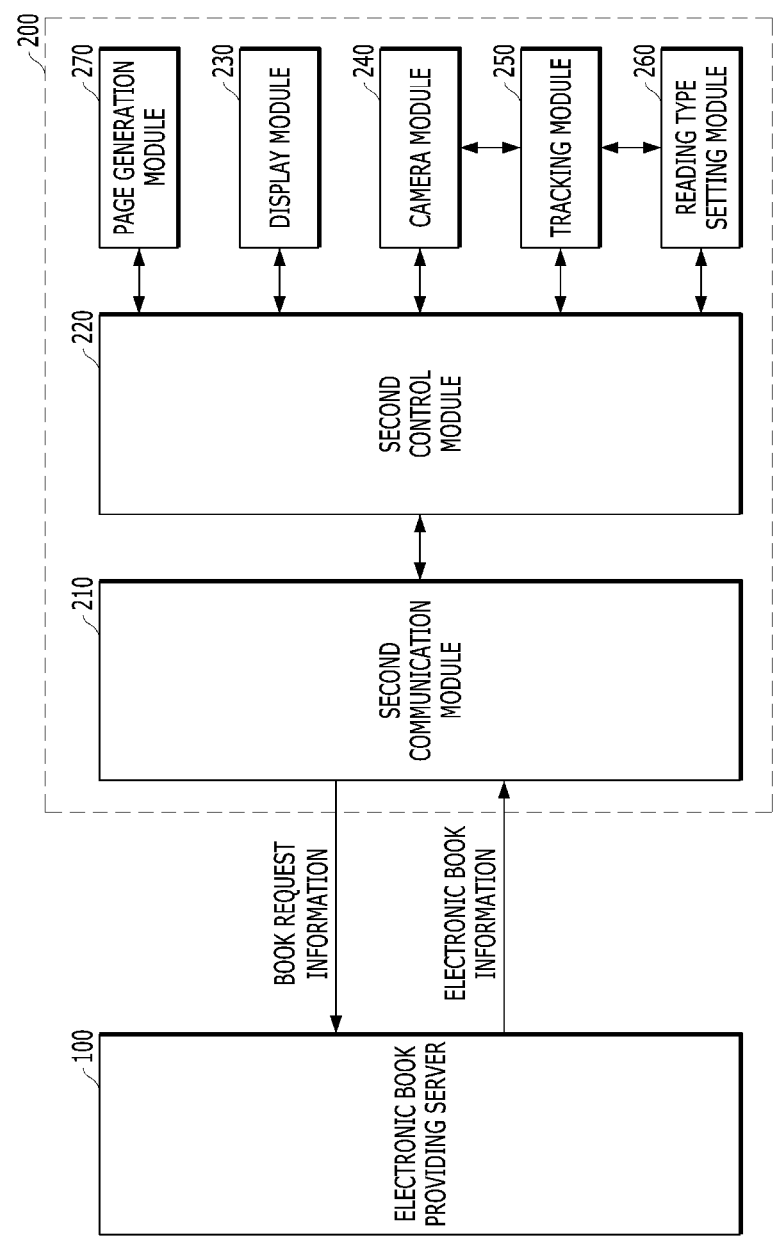
[FIG. 8]

[FIG. 9]
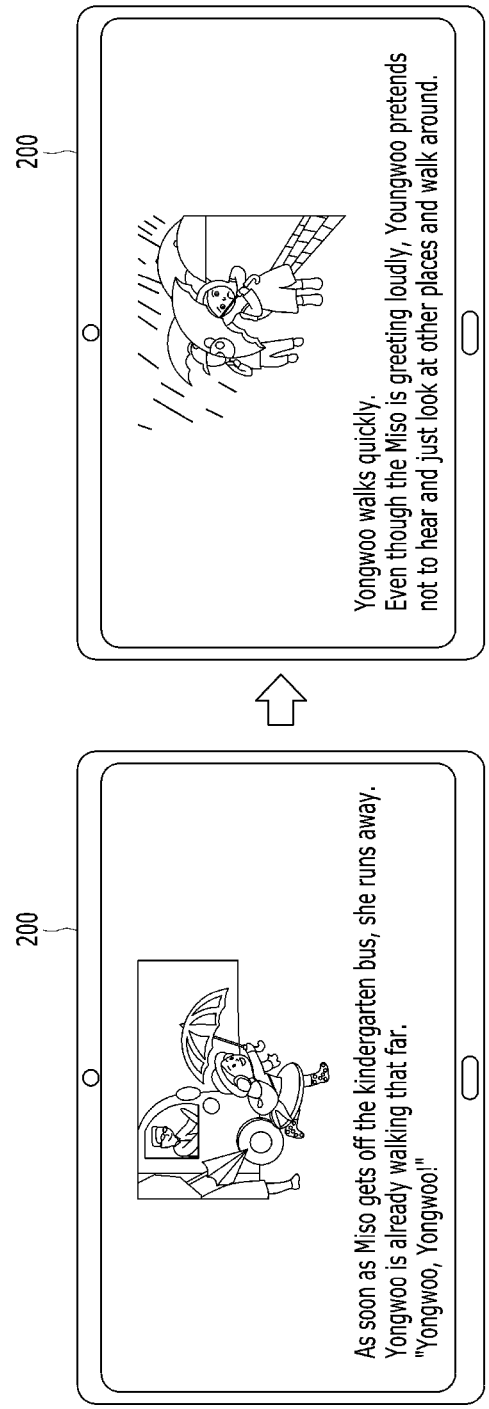

[FIG. 10]
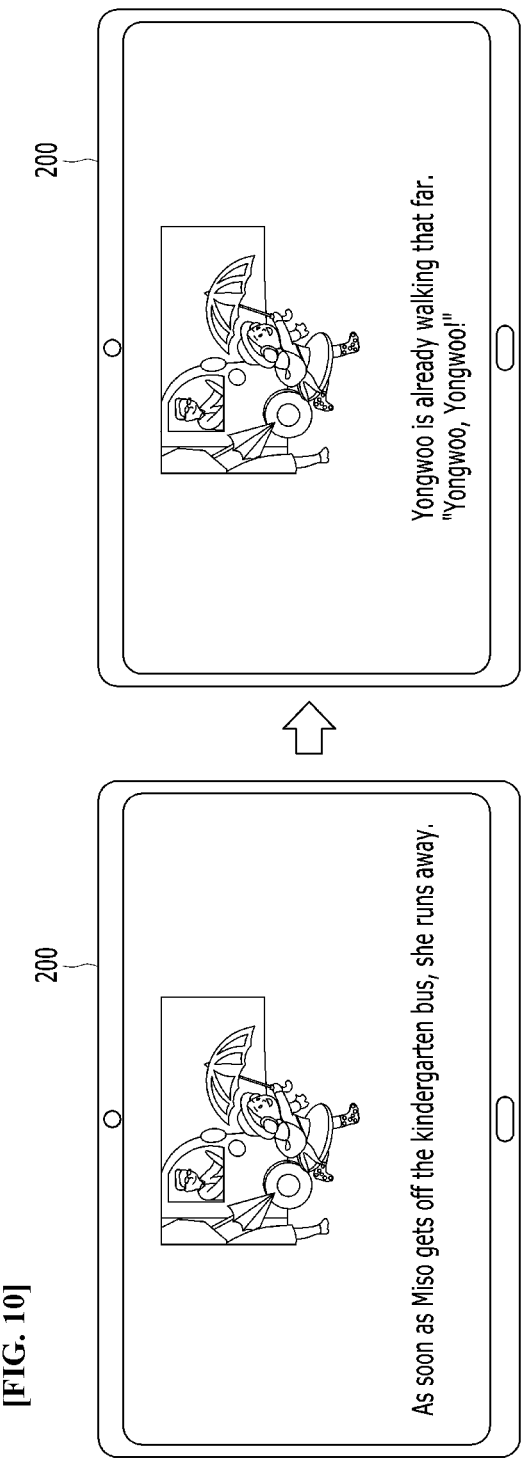

[FIG. 11]
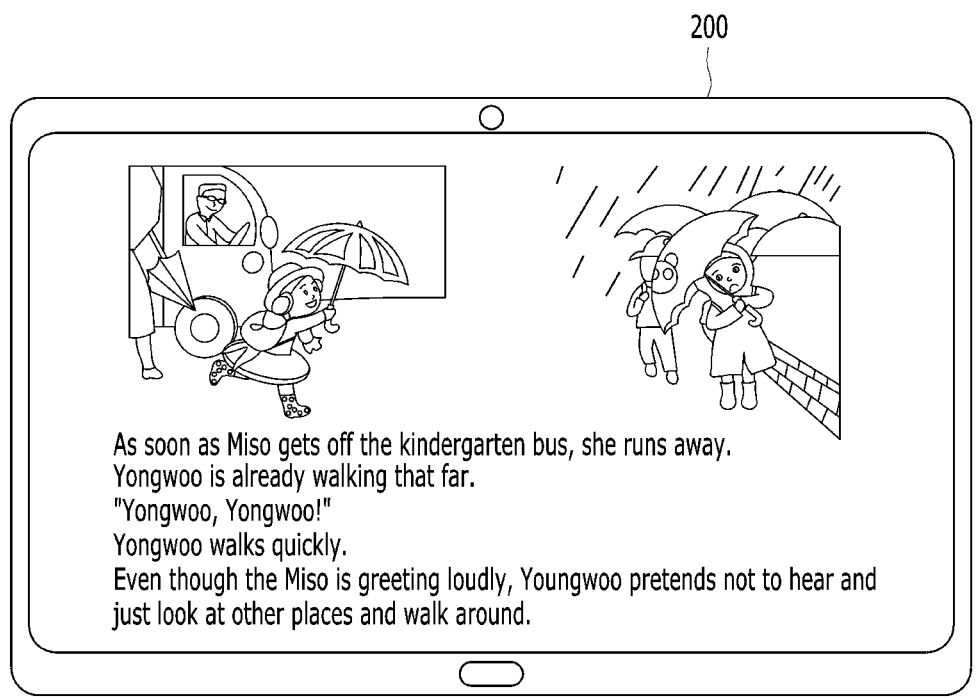

[FIG. 12]
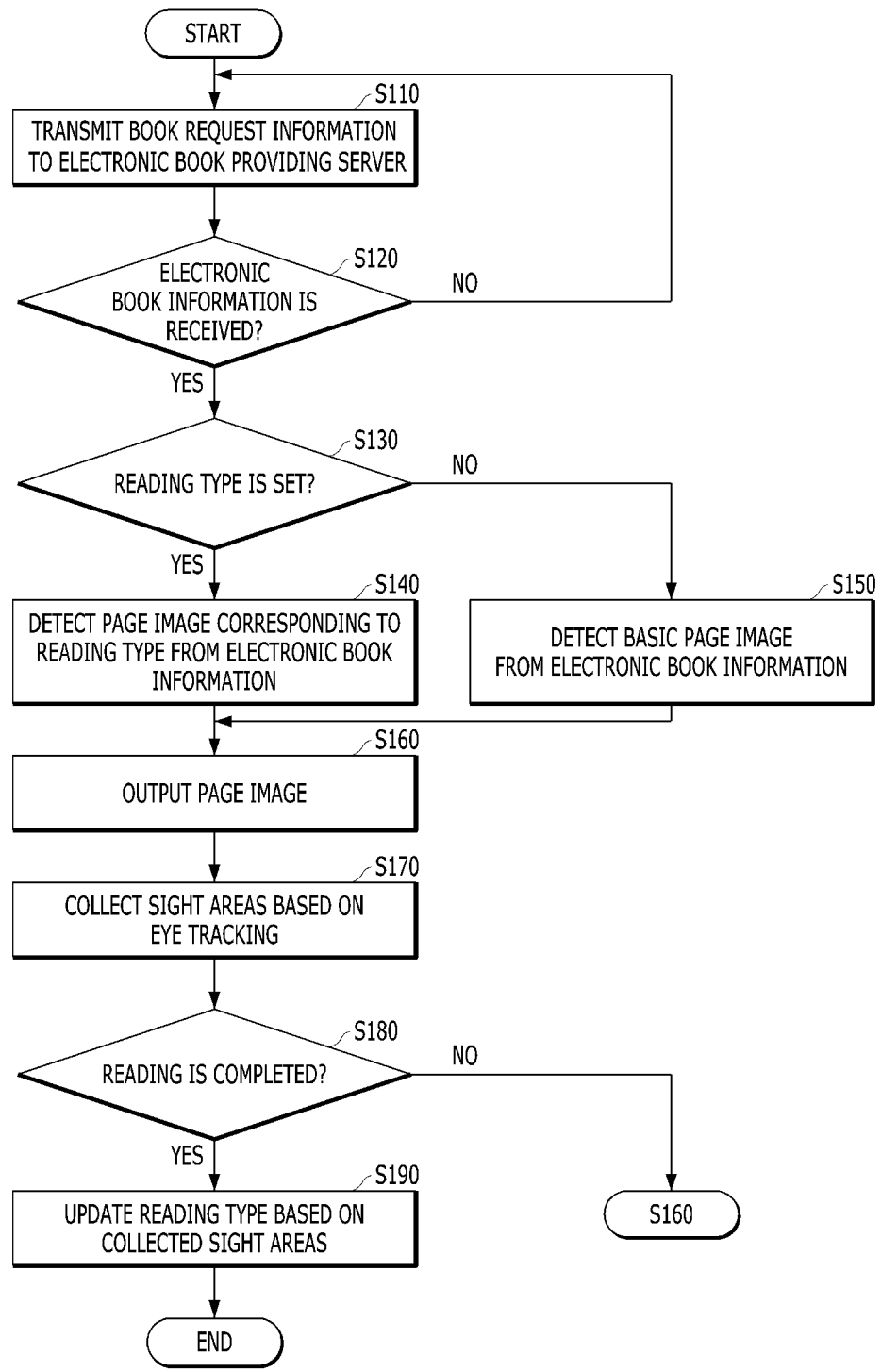

[FIG. 13]
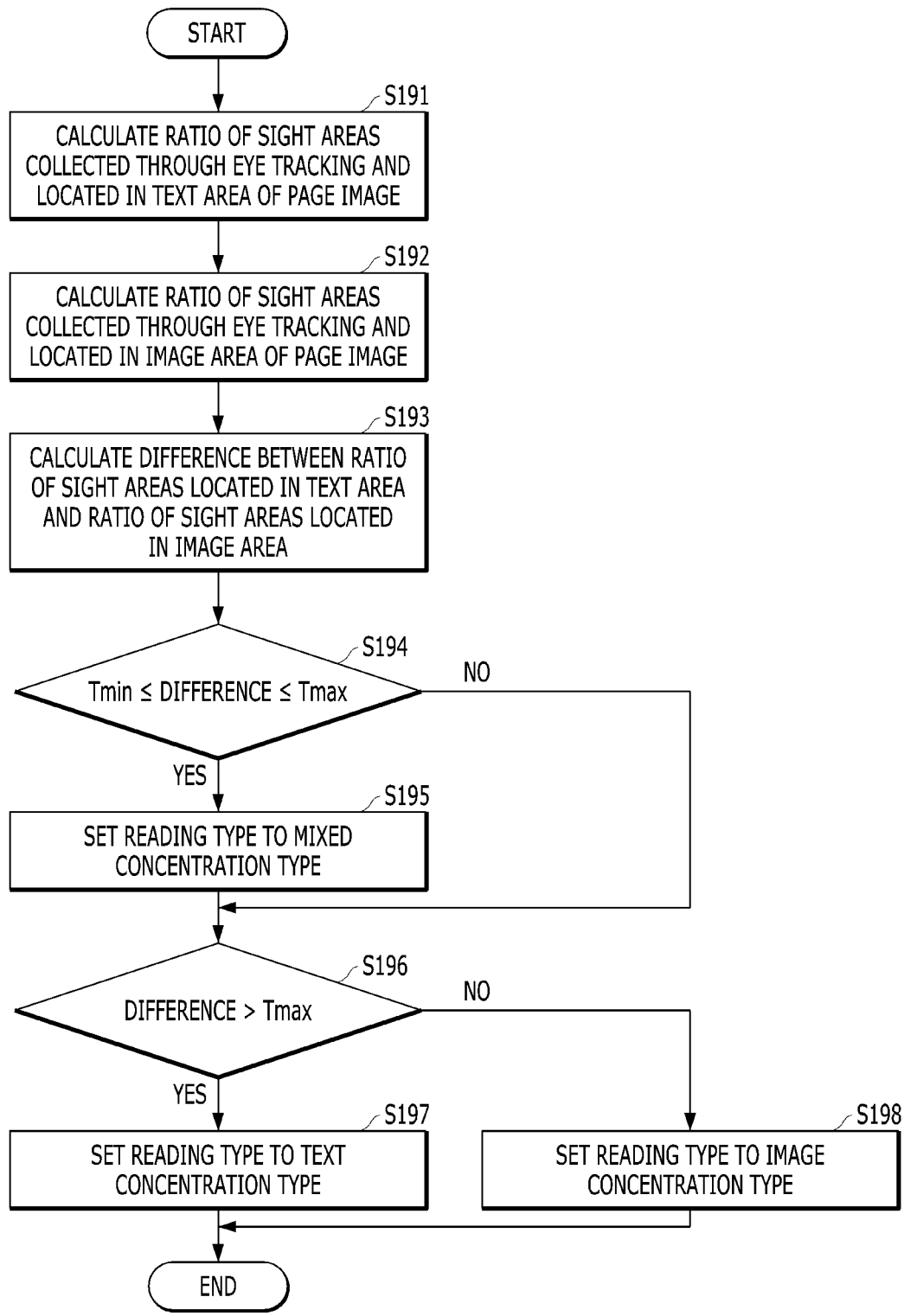

[FIG.14]
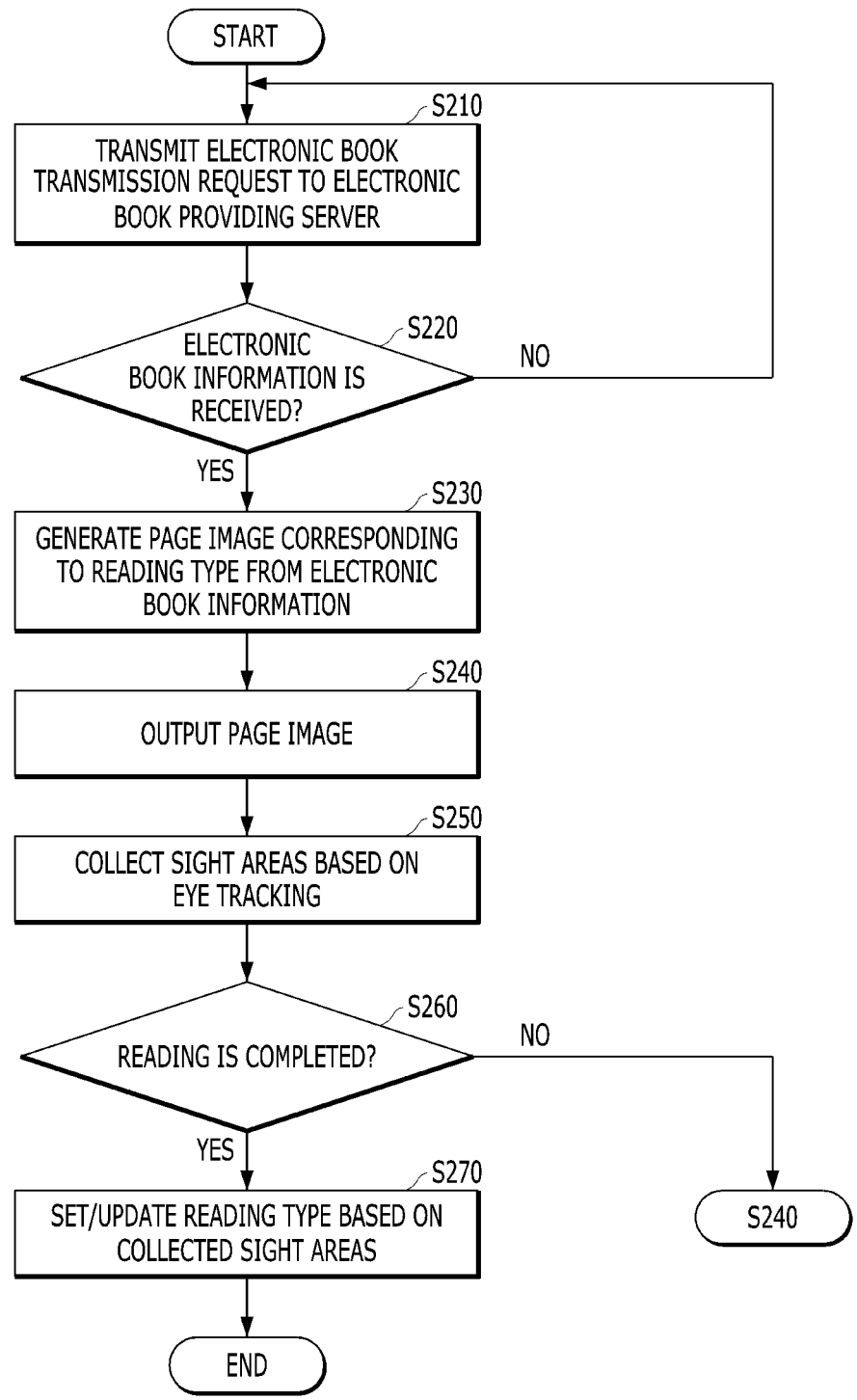

[FIG. 15]
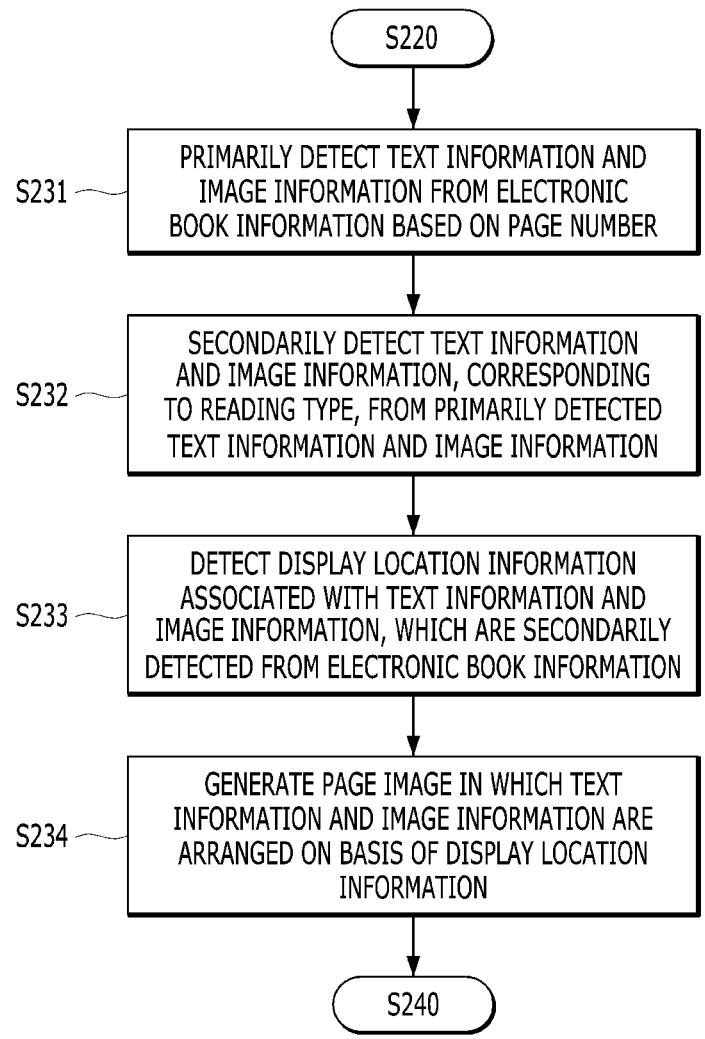

SYSTEM AND METHOD FOR PROVIDING ELECTRIC BOOK BASED ON READING TYPE

TECHNICAL FIELD

The present disclosure relates to a system and method for providing an electronic book, and more particularly, to a system and method for providing a user with an electronic book based on a reading type.

BACKGROUND ART

An electronic book is created by converting the contents of a real book into image files and text files such that a reader can read the contents through a reader terminal. The demand for electronic books is rapidly increasing with the popularization of reader terminals such as an electronic book-dedicated terminal, a smart phone, a laptop computer and a tablet PC.

A user connects to an electronic book providing server for providing electronic books, by using a reader terminal connected to a network. The reader terminal downloads an electronic book such as an image file and a text file from the electronic book providing server, and then outputs the electronic book through a display.

In the related art, however, since the electronic book is provided in a fixed form like a real book, the reading types of users are not reflected. Therefore, the reading concentration levels of some users may be degraded.

In particular, children have various reading types unlike adults who read books centering on text. Thus, when electronic books are provided in a fixed form, the reading concentration levels and efficiency of children may be degraded.

The contents described in the above background art is to promote understanding of the background of the invention, and may contain matters which are not prior arts already known to a person skilled in the art to which the present technology pertains.

RELATED ART DOCUMENT

Patent Document

Korean Patent No. 10-1204348

SUMMARY OF INVENTION

Technical Problem

The present disclosure is proposed to solve the above conventional problem, and an object of the present disclosure is to provide a system and method for providing an electronic book based on a reading type, which can determine a reading type through eye tracking, change one electronic book to various forms depending on the reading type, and provide the changed electronic book.

Solution to Problem

To achieve the object, a reader terminal according to an exemplary embodiment of the present disclosure includes: a memory configured to store instructions which, when executed, cause the reader terminal to perform operations, a communication circuit configured to transmit book request information including book identification information to the electronic book providing server, and receive electronic book information as a response to the book request information; a processor configured to, by executing the instructions stored in the memory, detect page images having different text and image ratios from the electronic book information received from the communication circuit, according to the reading type of a user, output a page image output signal including the detected page images, and output a reading type update request signal for requesting the setting of the reading type of the user; a display configured to output the page image of the electronic book onto a screen in response to the page image output signal of the processor; a camera configured to generate an eye movement image by capturing an image of eye movement of the user, who reads the page image outputted from the display, in response to the reading type update request signal of the processor, wherein the processor detects a sight area of the page image, at which the user stares, based on the eye movement image generated by the camera, while the display displays the page image, and wherein the processor sets the reading type of the user based on the page image and the sights area detected, divide the page image into a text area and an image area, and set the reading type based on the ratio of the sight areas located in the text area and the ratio of the sight areas located in the image area.

The communication circuit may receive the electronic book information including a page number, a basic page image in which a text ratio is equal to an image ratio, a text-based page image in which the text ratio is higher than the image ratio, and an image-based page image in which the image ratio is higher than the text ratio.

The processor may detect the basic page image from the electronic book information when the reading type is set to a mixed concentration type, detect the text-based page image from the electronic book information when the reading type is set to a text concentration type, detect the image-based page image from the electronic book information when the reading type is set to an image concentration type, and detect the basic page image from the electronic book information when the reading type is not set.

The processor may calculate a text sight ratio indicating the ratio of the sight areas located in the text area of the page image and an image sight ratio indicating the ratio of the sight areas located in the image area of the page image. The processor may set a maximum reference value and a minimum reference value as reading type determination criteria, and set the reading type by comparing at least one of the text sight ratio and the image sight ratio to the maximum reference value and the minimum reference value. The processor may calculate a difference between the text sight ratio and the image sight ratio, set the reading type to a mixed concentration type when the difference is equal to or more than the minimum reference value and equal to or less than the maximum reference value, set the reading type to a text concentration type when the difference exceeds the maximum reference value, and set the reading type to an image concentration type when the difference is less than the minimum reference value.

The communication circuit may receive the electronic book information including text information and image information which are associated with the reading type and display position information, and the processor detects the text information and the image information from the electronic book information, and generate a page image in which the detected text information and image information are disposed. At this time, the processor may primarily detect text information and image information, associated with the same page number as a page of the page image, from the electronic book information, secondarily detect text information and image information, associated with the same reading type as the reading type of the user, from the primarily detected text information and image information, and generate a page image in which the secondarily detected text information and image information are disposed, based on the display position information associated with the secondarily detected text information and image information.

To achieve the object, an electronic book providing method according to an exemplary embodiment of the present disclosure includes: transmitting book request information, including book identification information of an electronic book, to the electronic book providing server; receiving, as a response to the book request information, electronic book information including a page number, a basic page image in which a text ratio is equal to an image ratio, a text-based page image in which the text ratio is higher than the image ratio, and an image-based page image in which the image ratio is higher than the text ratio; detecting a page image having different text and image ratios from the electronic book information, according to the reading type of a user; outputting the page image detected in the detecting of the page image; collecting sight areas of the page image, at which the user stares, through eye tracking while the page image is outputted; and updating the reading type based on the sight areas collected in the collecting of the sight areas.

The detecting of the page image may include detecting, as a page image, one of the basic page image, the text-based page image and the image-based page image, based on the reading type, when the reading type is set. The detecting of the page image may include detecting the basic page image from the electronic book information when the reading type is set to a mixed concentration type, detecting the text-based page image from the electronic book information when the reading type is set to a text concentration type, and detecting the image-based page image from the electronic book information when the reading type is set to an image concentration type. The detecting of the page image may include detecting the basic page image from the electronic book information when the reading type is not set.

The collecting of the sight areas may include detecting sight areas of the page image, at which the user stares while the page image is outputted, based on an eye movement image generated by capturing an image of eye movement of the user who reads the output page image.

The updating of the reading type may include dividing the page image into a text area and an image area, and setting the reading type based on the ratio at which the sight areas collected in the collecting of the sight areas are located in the text area and the ratio at which the sight areas are located in the image area.

The updating of the reading type may include: calculating a text sight ratio indicating the ratio of the sight areas located in a text area of the page image; calculating an image sight ratio indicating the ratio at which the sight areas are located in an image area of the page image; and setting the reading type by comparing at least one of the text sight ratio and the image sight ratio to a maximum reference value and a minimum reference value which are reading type determination criteria. The setting of the reading type may include setting the reading type to a mixed concentration type when the difference between the text sight ratio and the image sight ratio is equal to or more than the minimum reference value and equal to or less than the maximum reference value, setting the reading type to a text concentration type when the difference exceeds the maximum reference value, and setting the reading type to an image concentration type when the difference is less than the minimum reference value.

To achieve the object, an electronic book providing method according to an exemplary embodiment of the present disclosure includes: transmitting book request information, including book identification information of an electronic book, to the electronic book providing server; receiving electronic book information including text information and image information, which are associated with the reading type and display position information, as a response to the book request information; generating a page image having different text and image ratios from the electronic book information, according to the reading type of a user; outputting the page image generated in the generating of the page image; collecting sight areas of the page image, at which the user stares, through eye tracking while the page image is outputted; and updating the reading type based on the sight areas collected in the collecting of the sight areas.

The generating of the page image may include detecting text information and image information from the electronic book information, and generating a page image in which the detected text information and image information are disposed. At this time, the generating of the page image may include: primarily detecting text information and image information, which are associated with the same page number as a page of the page image, from the electronic book information; secondarily detecting text information and image information, which are associated with the same reading type as the reading type of the user, from the text information and image information detected in the primarily detecting of the text information and the image information; detecting display position information associated with the text information and image information detected in the secondarily detecting of the text information and the image information; and generating a page image in which the secondarily detected text information and image information are disposed, based on the display position information detected in the detecting of the display position information.

The updating of the reading type may include setting the reading type by comparing at least one of a text sight ratio indicating the ratio of the sight areas located in a text area of the page image and an image sight ratio indicating the ratio of the sight areas located in an image area of the page image to a maximum reference value and a minimum reference value which are reading type determination criteria, and the setting of the reading type may include setting the reading type to a mixed concentration type when the difference between the text sight ratio and the image sight ratio is equal to or more than the minimum reference value and equal to or less than the maximum reference value, setting the reading type to a text concentration type when the difference exceeds the maximum reference value, and setting the reading type to an image concentration type when the difference is less than the minimum reference value.

Advantageous Effects

According to the present disclosure, the system and method for providing an electronic book may provide an electronic book configured in a suitable form for the reading types of children having various reading types, unlike adults who read books centering on text.

Furthermore, the system and method for providing an electronic book may provide an electronic book configured in a suitable form for a reading type, thereby improving the reading concentration level and efficiency of a user.

BRIEF DESCRIPTION OF DRAWINGS

FIG. 1 is a diagram for describing a system for providing an electronic book based on a reading type in accordance with an embodiment of the present disclosure.

FIG. 2 is a diagram for describing an electronic book providing server of FIG. 1.

FIG. 3 is a diagram for describing an example of electronic book information stored in a book storage module of FIG. 2.

FIG. 4 is a diagram for describing a reader terminal of FIG. 1.

FIGS. 5 and 6 are diagrams for describing an example in which the reader terminal of FIG. 1 sets the reading type of a user.

FIG. 7 is a diagram for describing a modified example of electronic book information stored in the electronic book providing server of FIG. 1.

FIG. 8 is a diagram for describing a reader terminal which interworks with the electronic book providing server of FIG. 7.

FIGS. 9 to 11 are diagrams for describing an example of a page image for each reading type, generated by the reader terminal of FIG. 8.

FIG. 12 is a flowchart for describing a method for providing an electronic book based on a reading type in accordance with an embodiment of the present disclosure.

FIG. 13 is a flowchart for describing a reading type update step of FIG. 12.

FIG. 14 is a flowchart for describing a modified example of the method for providing an electronic book based on a reading type in accordance with the embodiment of the present disclosure.

FIG. 15 is a flowchart for describing a page image generation step of FIG. 14.

DESCRIPTION OF EMBODIMENTS

Hereafter, exemplary embodiments will be described with reference to the accompanying drawings, in order to describe the technical idea of the present disclosure in detail such that a person skilled in the art to which the present disclosure pertains can easily carry out the technique idea of the present disclosure. First, it should be noted that the same components in the drawings are represented by like reference numerals even though the same components are illustrated in different drawings. Moreover, in describing the present disclosure, detailed descriptions for publicly known functions or configurations related to the present disclosure will be ruled out in order not to unnecessarily obscure the subject matters of the present disclosure.

Those skilled in the art will appreciate that various exemplary blocks, apparatuses, modules or operations described in connection with the configurations disclosed in the present specification may be implemented by electronic hardware, computer software, or a combination thereof. These blocks, apparatuses, modules or operations may be implemented or performed using a processor. The processor may be implemented by a combination of computing devices such as, a digital signal processor (DSP), an application-specific integrated circuit (ASIC) or an application-specific standard product (ASSP), a field-programmable gate array (FPGA) or other programmable logic device, an individual gate or transistor logic, an individual hardware component or any combination thereof designed to produce a configuration as disclosed in the present specification.

The processor may perform certain operation by executing a computer software stored in a memory device. The memory device may includes at least one of a random access memory (RAM), a read-only memory (ROM), a non-volatile RAM such as a flash RAM, an erasable and programmable ROM (EPROM), an electrically erasable and programmable ROM (EEPROM), a register, a hard disk, a removable disk, a CD-ROM, or any other form of storage medium known in the art. The memory device may be coupled with the processor, and the processor may read information from the memory device and write the information to the memory device. Alternatively, the memory device may be integral with the processor.

Reading is a behavior of reading a book. Men and women of all ages can read. In particular, children who are at the age of starting to read come into contact with books composed of texts and images in many cases, unlike adults. At this time, the children need to collectively understand complex symbols which are visually suggested, and experience a reading process while rapidly going through an aesthetic expression process. During this process, each of the children has a difference in reading.

Thus, a system and method for providing an electronic book in accordance with an embodiment of the present disclosure diagnose a user's reading type through a reading test to which an eye movement tracking technology is applied. Conventionally, eye tracking-based technologies have been utilized. However, the technologies have been mainly applied to text composed of sentences, in order to analyze the text.

Children who usually read fairy tale books understand the contents of the fairy tale books in a stereoscopic manner and search the fairy tale books in various manners, while seeing both texts and images which are important factors of the fairy tale books. Therefore, the system and method for providing an electronic book in accordance with the embodiment of the present disclosure apply the eye tracking technology to fairy tale books, in order to provide an electronic book in a form suitable for children.

In other words, the system and method for providing an electronic book in accordance with the embodiment of the present disclosure may diagnose a user's reading type through a reading test to which the eye movement tracking technology is applied, change an original electronic book according to the reading type, and provide the electronic book in a form which is convenient and profitable for a user to read.

More specifically, an object of the system and method for providing an electronic book in accordance with the embodiment of the present disclosure is to detect a type that a child prefers, between an image and text, through an eye tracking process for the child who reads an electronic book, and provide a customized electronic book based on the detected type.

For example, the system and method for providing an electronic book in accordance with the embodiment of the present disclosure may determine a user's reading type by measuring and analyzing sub elements of a processing model based on a personal difference in reading understanding process and an eye tracking result (i.e. eye movement pattern), and provide a text-based electronic book to a user having a reading type of quickly reading text, or provide an image-based electronic book to a user having a reading type in which his/her sight mostly stays in images. Thus, the system and method provide a customized electronic book according to the reading type of a user.

Referring to FIG. 1, a system for providing an electronic book based on a reading type (hereafter, referred to as an electronic book providing system) in accordance with an embodiment of the present disclosure includes an electronic book providing server 100 and a reader terminal 200 which are connected through a network.

The electronic book providing server 100 detects electronic book information in response to a book request of the reader terminal 200. The electronic book providing server 100 receives book request information from the reader terminal 200, the book request information including book identification information. In this case, the book identification information may be a book identifier through which an electronic book can be identified. The electronic book providing server 100 detects electronic book information corresponding to the detected book identification information. The electronic book providing server 100 transmits the detected electronic book information to the reader terminal 200.

For example, the electronic book providing server 100 stores page image information which is data obtained by storing each page of the electronic book in the form of an image, and detects page image information associated with the book identification information included in the book request of the reader terminal 200. The electronic book providing server 100 transmits the detected page image information to the reader terminal 200.

At this time, the electronic book providing server 100 associates three page images with one page, and manages the page images as the page image information. That is, the electronic book providing server 100 associates each page with a basic page image, a text-based page image and an image-based page image, in order to manage the corresponding page.

Referring to FIG. 2, the electronic book providing server 100 includes a first communication circuit 120, a book storage module 140, a first control module 160 and a book detection module 180.

As described in advance, the operations or configuration of the first control module 160 and the book detection module 180 could be understood as operations or configuration of at least one of processor. The processor may perform the operations by executing instructions in a computer program stored in a memory device. However, in the followings, the exemplary embodiments will be described using modules for a convenience of explanation.

The first communication circuit 120 transmits/receives data to/from the reader terminal 200, the data being used for providing an electronic book providing service.

The first communication circuit 120 receives the book request information from the reader terminal 200. The first communication circuit 120 receives the book request information including book identification information from the reader terminal 200, and transmits the received book request information to the first control module 160.

When receiving an electronic book information transmission request from the first control module 160, the first communication circuit 120 detects the electronic book information from the electronic book information transmission request. The first communication circuit 120 transmits the electronic book information to the reader terminal 200 having transmitted the book request information. At this time, the first communication circuit 120 transmits the electronic book information to the reader terminal 200, the electronic book information including a basic page image, a text-based page image and an image-based page image.

The book storage module 140 stores the electronic book information provided to the reader terminal 200. For example, the book storage module may be a memory device. The book storage module 140 associates the electronic book information with the book identification information, and stores the electronic book information associated with the book identification information.

For example, referring to FIG. 3, the book storage module 140 stores page image information as the electronic book information, the page image information being data obtained by storing each page of the electronic book in the form of an image. The book storage module 140 associates the page image information with a book identifier and a page number, which correspond to the electronic book, and stores the page image information with the book identifier and the page number. The book storage module 140 associates each page with a basic page image, a text-based page image and an image-based page image, and stores the images as the image information of the corresponding page.

When receiving the book request information from the first communication module, the first control module 160 detects the book identification information from the book request information. The first control module 160 generates an electronic book information detection request signal including the detected book identification information. The first control module 160 transmits the generated book information detection request signal to the book detection module 180.

When receiving the book information detection request signal from the first control module 160, the book detection module 180 detects the book identification information from the book information detection request signal. The book detection module 180 detects the electronic book information, associated with the detected book identification information, from the book storage module 140. The book detection module 180 transmits the detected electronic book information to the first control module 160.

For example, the book detection module 180 detects page image information from the book storage module 140, the page image information including a page number, a basic page image, a text-based page image and an image-based page image. At this time, the book detection module 180 detects all pieces of page image information associated with the same book identifier as the book identifier of the book identification information. The book detection module 180 generates electronic book information including the detected pieces of page image information. The book detection module 180 transmits the generated electronic book information to the first control module 160.

When receiving the electronic book information from the book detection module 180, the first control module 160 generates an electronic book information transmission request including the electronic book information. The first control module 160 transmits the electronic book information transmission request to the first communication circuit 120.

When an electronic book is selected by a user's manipulation, the reader terminal 200 generates book request information, and transmits the generated book request information to the electronic book providing server 100. The reader terminal 200 generates the book request information including the book identifier of the electronic book selected by the user, and transmits the generated book request information to the electronic book providing server 100 through the network.

The reader terminal 200 receives the electronic book information, as a response to the book request information, from the electronic book providing server 100. The reader terminal 200 outputs the electronic book information on the screen. When receiving the electronic book information including the page images, the reader terminal 200 sequentially outputs the page images included in the electronic book information, based on the page numbers.

When the reading type of the user is not set, the reader terminal 200 outputs the basic page image. While outputting the basic page image, the reader terminal 200 performs eye tracking to set the reading type of the user. At this time, the reader terminal 200 continuously performs the eye tracking and accumulates the eye tracking results, while the user reads the electronic book. When the progress of the user's reading reaches or exceeds a reference stage, the reader terminal 200 sets the reading type of the user based on the accumulated eye tracking results. For example, the reader terminal 200 sets the reading type of the user when a reference time elapses or at the point of time that the user completely reads a reference number of pages or completely reads a reference number of books.

For example, the reader terminal 200 divides a page image into a text area and an image area. The reader terminal 200 tracks the sight of the user through eye tracking, and measures the ratio of the time during which the sight of the user stays in the image area and the ratio of the time during which the sight of the user stays in the text area.

The reader terminal 200 sets the reading type of the user by comparing the difference between the two times to minimum and maximum reference values. When the difference between the two ratios is equal to or more than the minimum reference value and equal to or less than the maximum reference value, the reader terminal 200 sets the reading type to a mixed concentration type. When the difference between the two ratios exceeds the maximum reference value, the reader terminal 200 sets the reading type to a text concentration type. When the difference between the two ratios is less than the minimum reference value, the reader terminal 200 sets the reading type to an image concentration type.

When the reading type of the user is set, the reader terminal 200 outputs one of the basic page image, the text-based page image and the image-based page image, based on the reading type of the user. The reader terminal 200 outputs the basic page image when the reading type is the mixed concentration type, outputs the text-based page image when the reading type is the text concentration type, or outputs the image-based page image when the reading type is the image concentration type.

The reader terminal 200 may update the reading type of the user by performing eye tracking while outputting the page image. The reader terminal 200 continuously performs the eye tracking and accumulates the eye tracking results, while the user reads the electronic book. When the progress of the user's reading reaches or exceeds the reference stage, the reader terminal 200 updates the reading type of the user on the basis of the accumulated eye tracking results.

As soon as the reading type of the user is updated, the reader terminal 200 may output the page image based on the updated reading type. When the reading type of the user is updated, the reader terminal 200 may output the page image based on the updated reading type, from the point of time that the user reads the next electronic book.

Referring to FIG. 4, the reader terminal 200 includes a second communication circuit 210, a second control module 220, a display 230, a camera 240, a tracking module 250 and a reading type setting module 260.

In the following, as described in advance, the operations or configuration of the second control module 220, the tracking module 250 and the reading type setting module 260 could be understood as operations or configuration of at least one of processor. The processor may perform the operations by executing instructions in a computer program stored in a memory device. However, in the followings, the exemplary embodiments will be described using modules for a convenience of explanation.

The second communication circuit 210 transmits/receives data for use of the electronic book providing service to/from the electronic book providing server 100.

When receiving the book request information from the second control module 220, the second communication circuit 210 transmits the book request information to the electronic book providing server 100. The second communication circuit 210 transmits the book request information including book identification information to the electronic book providing server 100.

The second communication circuit 210 receives the electronic book information from the electronic book providing server 100. The second communication circuit 210 receives the electronic book information from the electronic book providing server 100, the electronic book information including a basic page image, a text-based page image and an image-based page image.

The second control module 220 generates book request information when an electronic book is selected by a user's manipulation. The second control module 220 generates book request information including the book identifier corresponding to the selected electronic book. The second control module 220 transmits the book request information to the second communication circuit 210.

When receiving the electronic book information from the second communication circuit 210, the second control module 220 detects a page number and a page image from the electronic book information. The second control module 220 generates a page image output signal including the page number and the page image. The second control module 220 transmits the page image output signal to the display 230.

When the reading type of the user is set, the second control module 220 detects one of the basic page image, the text-based page image and the image-based page image, included in the electronic book information, based on the reading type of the user. The second control module 220 detects the basic page image when the reading type is the mixed concentration type, detects the text-based page image when the reading type is the text concentration type, and detects the image-based page image when the reading type is the image concentration type. The second control module 220 transmits the page image output signal to the display 230, the page image output signal including the page number and the page image detected on the basis of the reading type.

When the reading type of the user is not set, the second control module 220 detects the basic page image from the electronic book information. The second control module 220 generates a page image output signal including the basic page image and the page number. The second control module 220 transmits the page image output signal to the display 230.

In addition, the second control module 220 transmits a reading type setting request signal to the camera 240, the tracking module 250 and the reading type setting module 260. The second control module 220 receives the reading type as a response to the reading type setting request signal.

The second control module 220 detects one of the basic page image, the text-based page image and the image-based page image which are included in the electronic book information, based on the received reading type. The second control module 220 transmits the page image output signal to the display 230, the page image output signal including the page number and the page image detected on the basis of the reading type.

The second control module 220 may transmit a reading type update request signal at the same time when the display 230 outputs the page image. The second control module 220 receives the reading type as a response to the reading type setting request signal. As soon as the reading type is updated, the second control module 220 transmits a page image output signal to the display 230, the page image output signal including a page number and a page image detected on the basis of the updated reading type. At this time, when the reading type of the user is updated, the second control module 220 may detect a page image based on the updated reading type, from the point of time that the user reads the next electronic book.

The display 230 outputs the page image in response to the page image output signal of the second control module 220. The display 230 detects the page number and the page image from the page image output signal, and outputs the page image based on the page number.

The display 230 outputs the basic page image when the reading type of the user is not set. When the reading type of the user is set, the display 230 outputs one page image of the basic page image, the text-based page image and the image-based page image, according to the reading type.

The camera 240 captures an image of eye movement of the user who stares at the reader terminal 200, and stores the captured image as an eye movement image, in response to the reading type setting request signal or the reading type update request signal of the second control module 220. The camera 240 cuts the captured eye movement image in units of frames or preset times, and transmits the cut eye movement images to the tracking module 250.

The tracking module 250 is driven in response to the reading type setting request signal or the reading type update request signal of the second control module 220. The tracking module 250 detects a sight area, corresponding to the coordinate of the area at which the user has stared, in the entire area of the electronic book displayed on the display, based on the eye movement image received from the camera 240. At this time, the tracking module 250 detects the sight area through eye tracking, and raises the detection accuracy of the sight area by performing calibration before the eye tracking. The tracking module 250 detects the sight area by identifying the positions and focus of the user's eyes through eye tracking. While the user reads the electronic book, the tracking module 250 continuously detects the sight area. The tracking module 250 transmits the detected sight area to the reading type setting module 260.

The reading type setting module 260 is driven in response to the reading type setting request signal or the reading type update request signal of the second control module 220. The reading type setting module 260 sets the reading type of the user, based on the page image displayed on the display and the sight area received from the tracking module 250. That is, the reading type setting module 260 checks the concentration level of the user by identifying the entire sight of the user based on the sight area and the page image, and determines the time during which the user's sight stays in each of the image and the text. At this time, the reading type setting module 260 divides the page image into a text area and an image area, and cumulatively measures the time during which the sight area stays in the text area and the time during which the sight area stays in the image area or cumulatively measures the frequency at which the sight area is located in the text area and the frequency at which the sight area is located in the image area.

When the progress of the user's reading reaches or exceeds the reference stage, the reading type setting module 260 sets or updates the reading type of the user based on the cumulated tracking result. The reading type setting module 260 transmits the set or updated reading type to the second control module 220. For example, the reading type setting module 260 sets the reading type of the user when a reference time elapses or at the point of time that the user completely reads a reference number of pages or more, or completely reads a reference number of books or more.

The reading type setting module 260 compares the sight area and the page image, and calculates the ratio of sight areas collected in the text area and the ratio of sight areas collected in the image area. That is, referring to FIG. 5, the reading type setting module 260 calculates the ratio of sight areas SA collected in a text area TA (i.e. text sight ratio) and the ratio of the sight areas SA collected in an image area IA (i.e. image sight ratio), based on the coordinates of the sight areas SA detected by the tracking module 250 and the text area TA and the image area IA of the page image.

The reading type setting module 260 sets the reading type of the user by comparing the difference between the calculated ratios to the reference values. At this time, the reading type setting module 260 sets the reading type of the user to one of the mixed concentration type, the text concentration type and the image concentration type, for example.

The reading type setting module 260 sets the reading type to the mixed concentration type, when the difference between the ratio of the sight areas collected in the text area and the ratio of the sight areas collected in the image area is equal to or more than the minimum reference value and equal to or less than the maximum reference value. The reading type setting module 260 sets the reading type to the text concentration type, when the difference between the ratio of the sight areas collected in the text area and the ratio of the sight areas collected in the image area exceeds the maximum reference value. The reading type setting module 260 sets the reading type to the image concentration type, when the difference between the ratio of the sight areas collected in the text area and the ratio of the sight areas collected in the image area is less than the minimum reference value. The minimum reference value may be set to a negative (−) value, and the maximum reference value may be set to a positive (+) value.

For example, FIG. 6 is based on the assumption that the minimum reference value Tmin is set to −20%, and the maximum reference value Tmax is set to +20%.

When the ratio R1 of the sight areas collected in the text area ranges from 40 to 60% and the ratio R2 of the sight areas collected in the image area ranges from 60% to 40%, the difference R1−R2 ranges from −20% to +20%. In this case, the reading type setting module 260 sets the reading type of the user to the mixed concentration type.

When the ratio R1 of the sight areas collected in the text area exceeds 60% and the ratio R2 of the sight areas collected in the image area is less than 40%, the difference R1−R2 exceeds+20%. Thus, since the difference R1−R2 exceeds the maximum reference value Tmax of +20%, the reading type setting module 260 sets the reading type of the user to the text concentration type.

When the ratio R1 of the sight areas collected in the text area is less than 40% and the ratio R2 of the sight areas collected in the image area exceeds 60%, the difference R1−R2 is less than −20%. Thus, since the difference R1−R2 is less than the minimum reference value Tmin of −20%, the reading type setting module 260 sets the reading type of the user to the image concentration type.

The electronic book providing server 100 in accordance with the embodiment of the present disclosure may also detect the text information and the image information, included in the electronic book, as the electronic book information.

Referring to FIG. 7, the book storage module 140 may store text and image included in an electronic book as the electronic book information. The book storage module 140 stores text information and image information as the electronic book information. The text information is data obtained by storing text included in the electronic book in the form of text or image, and the image information is data obtained by storing an image included in the electronic book in the form of image. Examples of the text information may include a word, vocabulary, morpheme, sentence, paragraph, expression, sign and the like, and examples of the image information may include a character name, animal name, object name, country, feature, color, theme, behavior, expression, emotion, feeling and the like. The book storage module 140 may store the image information and the text information which are associated with each other.

The book storage module 140 stores the text information and the image information which are associated with a book identifier corresponding to the electronic book, a page number, a reading type and display position information. For example, the book identifier is the unique identifier of the electronic book including the text information and the image information, the page number is a page of the electronic book, on which the text information and the image information are displayed, the reading type is a reading type in which the text information and the image information are used when a page image is generated, and the display position information is the (relative) coordinate of the position where the text information and the image information are displayed in the page image.

The book detection module 180 detects the book identification information from the book information detection request signal. The book detection module 180 detects electronic book information, associated with the detected book identification information, from the book storage module 140. That is, the book detection module 180 detects the text information and the image information, including the page number, the reading type and the display position information, as the electronic book information from the book storage module 140.

At this time, the book detection module 180 detects all pieces of text information and image information, which are associated with the same book identifier as the book identifier detected from the book information detection request signal. The book detection module 180 generates electronic book information including the detected pieces of text information and image information. The book detection module 180 transmits the generated electronic book information to the first control module 160.

When receiving the electronic book information from the book detection module 180, the first control module 160 generates an electronic book information transmission request including the electronic book information. The first control module 160 transmits the electronic book information transmission request to the first communication circuit 120.

When receiving the electronic book information transmission request from the first control module 160, the first communication circuit 120 detects the electronic book information from the electronic book information transmission request. The first communication circuit 120 transmits the electronic book information to the reader terminal 200 having transmitted the book request information. At this time, the first communication circuit 120 transmits the electronic book information to the reader terminal 200, the electronic book information including the text information, the image information, and the page number, the reading type and the display position information of each information.

Referring to FIG. 8, the reader terminal 200 further includes a page generation module 270 configured to generate a page image by using the text information and the image information of the electronic book information received from the electronic book providing server 100.

As described in advance, the operations or configuration of the page generation module 270 could be understood as operations or configuration of at least one of processor. The processor may perform the operations by executing instructions in a computer program stored in a memory device. However, in the followings, the exemplary embodiments will be described using modules for a convenience of explanation.

The page generation module 270 generates the page image into which the positions of the text information and the image information are reflected, based on the reading type of the user.

The page generation module 270 detects text information and image information, which are included in the page image, from the electronic book information based on a page number. The page generation module 270 primarily detects text information and image information, which have the same page number, among the plural pieces of text information and image information which are included in the electronic book information.

For example, when generating a page image corresponding to a page 1 of an electronic book having a book identifier "B01", the page generation module 270 primarily detects text information 1-1, text information 1-2, text information 1-3, image information 1-1, image information 1-2 and image information 1-3, which correspond to the page number 1.

The page generation module 270 secondarily detects text information and image information, which have the same reading type as the reading type of the user, among the plural pieces of text information and image information which are detected through the primary detection.

For example, when the reading type of the user is the mixed concentration type, the page generation module 270 secondarily detects the text information 1-1 and the image information 1-1, which correspond to the mixed concentration type, among the text information 1-1, the text information 1-2, the text information 1-3, the image information 1-1, the image information 1-2 and the image information 1-3, which are detected through the primary detection.

The page generation module 270 generates a page image including the text information and the image information which are detected through the secondary detection. The page generation module 270 detects the display position information associated with the text information and the image information, which are secondarily detected, and generates the page image in which the text information and the image information are disposed on the basis of the display position information.

For example, when the text information 1-1 and the image information 1-1 are detected through the secondary detection, the page generation module 270 generates the page image, and then disposes the text information 1-1 at a position corresponding to display position information (x11, y11) associated with the text information 1-1. The page generation module 270 disposes the image information 1-1 at a position corresponding to display position information (x11', y11') associated with the image information 1-1. Through this operation, the page generation module 270 generates the page image corresponding to the page 1 of the electronic book whose book identifier is "B01", and including the text information 1-1 and the image information 1-1.

For example, referring to FIG. 9 illustrating that the reading type of the user is the mixed concentration type, the page generation module 270 generates a page image of the page 1 in which the text information and the image information are disposed at the same ratio, and then generates a page image of the page 2. The reader terminal 200 sequentially outputs the page image of the page 1 and the page image of the page 2.

For another example, referring to FIG. 10 illustrating that the reading type of the user is the image concentration type, the page generation module 270 divides the text information of the page 1, and generates two page images, each including text information, as page images corresponding to the page 1. Thus, the page generation module 270 generates the page images each having less text than the page image of the mixed concentration type. The reader terminal 200 sequentially outputs the two page images of the page 1.

For another example, referring to FIG. 11 illustrating that the reading type of the user is the text concentration type, the page generation module 270 generates one page image by combining the text information and the image information of the pages 1 and 2. Thus, the page generation module 270 combines two pages of the electronic book into one page, and generates a page image having more text than the page images of the mixed concentration type and the image concentration type. The reader terminal 200 outputs one page image including the page 1 and the page 2.

As such, according to the reading type of a user, the electronic book providing system in accordance with the embodiment of the present disclosure outputs one of a page image in which the image ratio is equal to the text ratio, a page image in which the image ratio is larger than the text ratio, and a page image in which the text ratio is larger than the image ratio.

Through this operation, the electronic book providing system may provide an electronic book configured in a form suitable for children having various reading types, unlike adults who read books centering on text.

Furthermore, the electronic book providing system may provide an electronic book configured in a form suitable for the reading type of a user, thereby improving the reading concentration level and efficiency of the user.

In the present embodiment of the present disclosure, it has been described that the reader terminal 200 sets the reading type of the user. However, the present disclosure is not limited thereto, but the reading type setting module may be included in the electronic book providing server 100, and set the reading type of the user based on the sight areas detected by the tracking module 250 of the reader terminal 200, or the tracking module 250 and the reading type setting module may be included in the electronic book providing server 100, and set the reading type of the user based on the eye movement image captured by the reader terminal 200.

In the embodiment of the present disclosure, it has been described that the reading type setting module 260 sets the reading type of the user, based on the page image and the sight area detected by the tracking module 250. However, the present disclosure is not limited thereto, but the reading type setting module 260 may set the reading type of the user more accurately on the basis of a reading speed for each sentence, a reading speed for each page, page reversing, sight deviation, the degree of appropriateness in sight position, and repetition rate.

Hereafter, an electronic book providing method in accordance with an embodiment of the present disclosure will be described in detail with reference to the accompanying drawings.

Referring to FIG. 12, when an electronic book is selected by a user's manipulation, the reader terminal 200 generates book request information, and transmits the generated book request information to the electronic book providing server 100, in step S110. The reader terminal 200 generates book request information including the book identifier of the electronic book selected by the user, and transmits the generated book request information to the electronic book providing server 100.

The reader terminal 200 receives electronic book information, as a response to the book request information, from the electronic book providing server 100. At this time, the reader terminal 200 receives the electronic book information from the electronic book providing server 100, the electronic book information including a basic page image, a text-based page image and an image-based page image. When receiving the electronic book information (Yes in step S120), the reader terminal 200 checks whether the reading type of the user is set.

When the reading type of the user is set (Yes in step S130), the reader terminal 200 detects a page image, corresponding to the set reading type, from the electronic book information in step S140. That is, when the reading type of the user is set, the reader terminal 200 outputs one of the basic page image, the text-based page image and the image-based page image, which are included in the electronic book information, based on the reading type of the user. For example, the reader terminal 200 outputs the basic page image when the reading type is the mixed concentration type, outputs the text-based page image when the reading type is the text concentration type, and outputs the image-based page image when the reading type is the image concentration type.

When the reading type of the user is not set (No in step S130), the reader terminal 200 detects the basic page image from the electronic book information in step S150. That is, the reader terminal 200 detects the basic page image as a page image at the initial stage in which the reading type of the user is not set.

The reader terminal 200 outputs the detected page image through a display in step S160. The reader terminal 200 sequentially outputs page images based on page numbers.

In addition, the reader terminal 200 collects sight areas based on eye tracking, in step S170. That is, when a page image is outputted on the display, the reader terminal 200 drives the camera 240 to capture an image of eye movement of the user who stares at the reader terminal 200. The reader terminal 200 detects a sight area, corresponding to the coordinate of the area at which the user stares, in the entire area of the electronic book displayed on the display, based on the image (video) captured by the camera 240. At this time, the reader terminal 200 detects the sight area by checking the positions and focus of the user's eyes through eye tracking. At this time, the reader terminal 200 continuously detects the sight areas while the user reads the electronic book.

When the user completely reads the electronic book (Yes in step S180), the reader terminal 200 updates the reading type of the user based on the sight areas collected during the user's reading, in step S190. The reader terminal 200 updates the reading type of the user based on the page image and the sight areas collected in step S170.

Referring to FIG. 13, step S190 of updating the reading type will be described in more detail as follows.

The reader terminal 200 measures the ratio of the sight areas which are collected through the eye tracking in step S170 and located in the text area of the page image, in step S191. The reader terminal 200 divides the page image into a text area and an image area, and measures the ratio of the sight areas located in the text area of the page image.

The reader terminal 200 measures the ratio of the sight areas which are collected through the eye tracking in step S170 and located in the image area of the page image, in step S192. The reader terminal 200 divides the page image into a text area and an image area, and measures the ratio of the sight areas located in the image area of the page image.

The reader terminal 200 calculates the difference between the ratio of the sight areas located in the text area and the ratio of the sight areas located in the image area, in step S193, and determines the reading type of the user by comparing the calculated difference to a maximum reference value Tmax and a minimum reference value Tmin.

When the difference is equal to or more than the minimum reference value Tmin and equal to or less than the maximum reference value Tmax (Yes in step S194), the reader terminal 200 determines that the reader type is the mixed concentration type, and sets (updates) the reading type of the user to the mixed concentration type, in step S195.

When the difference exceeds the maximum reference value Tmax (Yes in step S196), the reader terminal 200 determines that the reading type is the text concentration type, and sets the reading type of the user to the text concentration type, in step S197.

When the difference is less than the minimum reference value Tmin (No in step S196), the reader terminal 200 determines that the reading type is the image concentration type, and sets the reading type of the user to the image concentration type, in step S198.

Hereafter, an electronic book providing method in accordance with a modified example of the embodiment of the present disclosure will be described in detail with reference to the accompanying drawings.

Referring to FIG. 14, when an electronic book is selected by a user's manipulation, the reader terminal 200 generates book request information, and transmits the generated book request information to the electronic book providing server 100, in step S210. The reader terminal 200 generates book request information including the book identifier of the electronic book selected by the user, and transmits the generated book request information to the electronic book providing server 100.

The reader terminal 200 receives the electronic book information, as a response to the book request information, from the electronic book providing server 100. At this time, the reader terminal 200 receives the electronic book information from the electronic book providing server 100, the electronic book information including text information and image information. When receiving the electronic book information (Yes in step S220), the reader terminal 200 generates a page image corresponding to the set reading type from the electronic book information, in step S230.

Referring to FIG. 15, the reader terminal 200 primarily detects the text information and the image information from the electronic book information based on the page numbers, in step S231. The reader terminal 200 primarily detects the text information and the image information, which have the same page numbers, among the plural pieces of text information and image information which are included in the electronic book information. At this time, the reader terminal 200 detects the text information and the image information, which have the same page number as a page to be generated, from the electronic book information.

The reader terminal 200 secondarily detects text information and image information, which have the same reading type as the reading type of the user, among the plural pieces of text information and image information which are detected through the primary detection, in step S232. The reader terminal 200 detects the text information and the image information, which correspond to the reading type of the user, among the plural pieces of text information and image information which are primarily detected in step S231.

The reader terminal 200 detects display position information, associated with the secondarily detected text information and image information, from the electronic book information in step S233. That is, the reader terminal 200 detects the display position information, associated with each of the secondarily detected text information and image information, from the electronic book information. For example, the display position information indicates the relative position coordinate at which the text information or image information is displayed on the page image. The display position information may indicate the relative position coordinate at which the text information or image information is displayed on the display of the reader terminal 200.

The reader terminal 200 generates a page image in which the text information and the image information are disposed, based on the display position information, in step S234. The reader terminal 200 generates a page image for each page of the electronic book by disposing the text information and the image information based on the display position information detected in step S233.

The reader terminal 200 outputs the detected page images through the display in step S240. The reader terminal 200 sequentially outputs the page images based on the page numbers.

In addition, the reader terminal 200 collects sight areas based on eye tracking, in step S250. That is, when a page image is outputted on the display, the reader terminal 200 drives the camera 240 to capture an image of eye movement of the user who stares at the reader terminal 200. The reader terminal 200 detects a sight area, corresponding to the coordinate of the area at which the user stares, in the entire area of the electronic book displayed on the display, based on the image (video) captured by the camera 240. At this time, the reader terminal 200 detects the sight area by checking the positions and focus of the user's eyes through eye tracking. At this time, the reader terminal 200 continuously detects the sight areas while the user reads the electronic book.

When the user completely reads the electronic book (Yes in step S260), the reader terminal 200 updates the reading type of the user based on the sight areas collected during the user's reading, in step S270. The reader terminal 200 updates the reading type of the user based on the page image and the sight areas collected in step S250.

In the embodiment of the present disclosure, it has been described that the reader terminal 200 sets the reading type of the user, and detects and generates the page image. However, the present disclosure is not limited thereto, but the electronic book providing server 100 may set the reading type of the user, and detect and generate the page image. In this case, the reading type setting module 260 and the page generation module 270 of the reader terminal 200 may be included and operated as components of the electronic book providing server 100.

Although the preferred exemplary embodiments of the present disclosure have been described above, it is understood that the present disclosure may be modified in various forms, and those skilled in the art may practice various modified examples and changed examples without departing from the scope of the claims of the present disclosure.

The invention claimed is:

1. A reader terminal which downloads an electronic book from an electronic book providing server of an electronic book providing system and outputs the downloaded electronic book, the reader terminal comprising:
   a memory configured to store instructions which, when executed, cause the reader terminal to perform operations;
   a communication circuit configured to transmit book request information including book identification information to the electronic book providing server, and receive electronic book information as a response to the book request information;
   a processor configured to, by executing the instructions stored in the memory, detect page images having different text and image ratios from the electronic book information received from the communication module, according to the reading type of a user, output a page image output signal including the detected page images, and output a reading type update request signal for requesting the setting of the reading type of the user;
   a display configured to output the page image of the electronic book onto a screen in response to the page image output signal of the processor; and
   a camera configured to generate an eye movement image by capturing an image of eye movement of the user, who reads the page image outputted from the display, in response to the reading type update request signal of the processor;
   wherein the processor detects a sight area of the page image, at which the user stares, based on the eye movement image generated by the camera, while the display displays the page image, and
   wherein the processor sets the reading type of the user based on the page image and the sights area detected, divide the page image into a text area and an image area, and set the reading type based on the ratio of the sight areas located in the text area and the ratio of the sight areas located in the image area,
   wherein the electronic book information includes a page number, a basic page image in which a text ratio is equal to an image ratio, a text-based page image in which the text ratio is higher than the image ratio, and an image-based page image in which the image ratio is higher than the text ratio.

2. The reader terminal of claim 1, wherein the processor detects the basic page image from the electronic book information when the reading type is set to a mixed concentration type, detects the text-based page image from the electronic book information when the reading type is set to a text concentration type, and detects the image-based page image from the electronic book information when the reading type is set to an image concentration type.

3. The reader terminal of claim 1, wherein the processor detects the basic page image from the electronic book information when the reading type is not set.

4. The reader terminal of claim 1, wherein the processor calculates a text sight ratio indicating the ratio of the sight areas located in the text area of the page image and an image sight ratio indicating the ratio of the sight areas located in the image area of the page image.

5. The reader terminal of claim 4, wherein the processor sets a maximum reference value and a minimum reference value as reading type determination criteria, and sets the reading type by comparing at least one of the text sight ratio and the image sight ratio to the maximum reference value and the minimum reference value.

6. The reader terminal of claim 5, wherein the processor calculates a difference between the text sight ratio and the image sight ratio, sets the reading type to a mixed concentration type when the difference is equal to or more than the minimum reference value and equal to or less than the maximum reference value, sets the reading type to a text concentration type when the difference exceeds the maximum reference value, and sets the reading type to an image concentration type when the difference is less than the minimum reference value.

7. The reader terminal of claim 1, wherein the communication circuit receives the electronic book information including text information and image information which are associated with the reading type and display position information,
   wherein the processor detects the text information and the image information from the electronic book information, and generate a page image in which the detected text information and image information are disposed.

8. The reader terminal of claim 7, wherein the processor primarily detects text information and image information, associated with the same page number as a page of the page image, from the electronic book information, secondarily detects text information and image information, associated with the same reading type as the reading type of the user, from the primarily detected text information and image information, and generates a page image in which the secondarily detected text information and image information are disposed, based on the display position information associated with the secondarily detected text information and image information.

9. An electronic book providing method using a reader terminal which downloads an electronic book from an electronic book providing server of an electronic book providing system and outputs the downloaded electronic book, the electronic book providing method comprising:
   transmitting book request information, including book identification information of an electronic book, to the electronic book providing server;
   receiving, as a response to the book request information, electronic book information including a page number, a basic page image in which a text ratio is equal to an image ratio, a text-based page image in which the text ratio is higher than the image ratio, and an image-based page image in which the image ratio is higher than the text ratio;
   detecting a page image having different text and image ratios from the electronic book information, according to the reading type of a user;

outputting the page image detected in the detecting of the page image;
collecting sight areas of the page image, at which the user stares, through eye tracking while the page image is outputted; and
updating the reading type based on the sight areas collected in the collecting of the sight areas.

10. The electronic book providing method of claim 9, wherein the detecting of the page image comprises detecting, as a page image, one of the basic page image, the text-based page image and the image-based page image, based on the reading type, when the reading type is set,
wherein the detecting of the page image comprises detecting the basic page image from the electronic book information when the reading type is set to a mixed concentration type, detecting the text-based page image from the electronic book information when the reading type is set to a text concentration type, and detecting the image-based page image from the electronic book information when the reading type is set to an image concentration type.

11. The electronic book providing method of claim 9, wherein the detecting of the page image comprises detecting the basic page image from the electronic book information when the reading type is not set.

12. The electronic book providing method of claim 9, wherein the collecting of the sight areas comprises detecting sight areas of the page image, at which the user stares while the page image is outputted, based on an eye movement image generated by capturing an image of eye movement of the user who reads the output page image.

13. The electronic book providing method of claim 9, wherein the updating of the reading type comprises dividing the page image into a text area and an image area, and setting the reading type based on the ratio at which the sight areas collected in the collecting of the sight areas are located in the text area and the ratio at which the sight areas are located in the image area.

14. The electronic book providing method of claim 9, wherein the updating of the reading type comprises:
calculating a text sight ratio indicating the ratio of the sight areas located in a text area of the page image;
calculating an image sight ratio indicating the ratio at which the sight areas are located in an image area of the page image; and
setting the reading type by comparing at least one of the text sight ratio and the image sight ratio to a maximum reference value and a minimum reference value which are reading type determination criteria.

15. The electronic book providing method of claim 14, wherein the setting of the reading type comprises setting the reading type to a mixed concentration type when the difference between the text sight ratio and the image sight ratio is equal to or more than the minimum reference value and equal to or less than the maximum reference value, setting the reading type to a text concentration type when the difference exceeds the maximum reference value, and setting the reading type to an image concentration type when the difference is less than the minimum reference value.

16. An electronic book providing method using a reader terminal which downloads an electronic book from an electronic book providing server of an electronic book providing system and outputs the downloaded electronic book, the electronic book providing method comprising:
transmitting book request information, including book identification information of an electronic book, to the electronic book providing server;
receiving electronic book information including text information and image information, which are associated with the reading type and display position information, as a response to the book request information;
generating a page image having different text and image ratios from the electronic book information, according to the reading type of a user;
outputting the page image generated in the generating of the page image;
collecting sight areas of the page image, at which the user stares, through eye tracking while the page image is outputted; and
updating the reading type based on the sight areas collected in the collecting of the sight areas,
wherein the electronic book information includes a page number, a basic page image in which a text ratio is equal to an image ratio, a text-based page image in which the text ratio is higher than the image ratio, and an image-based page image in which the image ratio is higher than the text ratio.

17. The electronic book providing method of claim 16, wherein the generating of the page image comprises detecting text information and image information from the electronic book information, and generating a page image in which the detected text information and image information are disposed.

18. The electronic book providing method of claim 16, wherein the generating of the page image comprises:
primarily detecting text information and image information, which are associated with the same page number as a page of the page image, from the electronic book information;
secondarily detecting text information and image information, which are associated with the same reading type as the reading type of the user, from the text information and image information detected in the primarily detecting of the text information and the image information;
detecting display position information associated with the text information and image information detected in the secondarily detecting of the text information and the image information; and
generating a page image in which the secondarily detected text information and image information are disposed, based on the display position information detected in the detecting of the display position information.

19. The electronic book providing method of claim 16, wherein the updating of the reading type comprises setting the reading type by comparing at least one of a text sight ratio indicating the ratio of the sight areas located in a text area of the page image and an image sight ratio indicating the ratio of the sight areas located in an image area of the page image to a maximum reference value and a minimum reference value which are reading type determination criteria, and the setting of the reading type comprises setting the reading type to a mixed concentration type when the difference between the text sight ratio and the image sight ratio is equal to or more than the minimum reference value and equal to or less than the maximum reference value, setting the reading type to a text concentration type when the difference exceeds the maximum reference value, and setting the reading type to an image concentration type when the difference is less than the minimum reference value.

* * * * *